United States Patent [19]

Hodder

[11] 4,140,398
[45] Feb. 20, 1979

[54] LASER AUTOALIGNMENT SYSTEM USING DISTORTION COMPENSATED REFLECTION GRATING

[75] Inventor: Robert E. Hodder, Jensen Beach, Fla.

[73] Assignee: The United States of America as represented by the Secretary of the Navy, Washington, D.C.

[21] Appl. No.: 834,098

[22] Filed: Sep. 16, 1977

[51] Int. Cl.² ............................................. G01B 11/26
[52] U.S. Cl. ..................................... 356/152; 250/201
[58] Field of Search ...................... 250/201; 356/152; 332/7.51

[56] References Cited

U.S. PATENT DOCUMENTS

| | | | |
|---|---|---|---|
| 3,622,788 | 11/1971 | Briggs | 356/152 |
| 3,825,845 | 7/1974 | Angelbeck et al. | 332/7.51 |
| 3,872,407 | 3/1975 | Hughes | 332/7.51 |
| 3,943,457 | 3/1976 | Lehmberg | 332/7.51 |

Primary Examiner—S. C. Buczinski

Attorney, Agent, or Firm—R. S. Sciascia; A. L. Branning; A. S. Viger

[57] ABSTRACT

A method and system for automatically aligning a high power laser utilizing a diffraction ruled reflection grating to sample the laser beam. A tiltable beam alignment mirror directs a laser beam in a path incident to the reflection grating which separates the incident beam into a reflected beam and first and second order diffraction beams. A tiltable distortion compensation mirror is positioned in the path of the two diffraction beams. Two auxiliary fixed mirrors are positioned such that the diffraction beams will reflect a predetermined number of times off the distortion compensation mirror prior to reflecting toward respective null position detectors. Error signals from these detectors are translated, in accordance with certain optical and mathematical relationships, into angular adjustments to the two tiltable mirrors, thereby compensating for the thermal distortion of the reflection grating and aligning the output laser beam.

17 Claims, 2 Drawing Figures

LASER AUTOALIGNMENT SYSTEM USING DISTORTION COMPENSATED REFLECTION GRATING

BACKGROUND OF THE INVENTION

The present invention relates to the field of autoalignment systems for high power lasers and more particularly to autoalignment systems utilizing output beam sampling by means of diffractive reflection gratings. In even greater particularity, the present invention relates to autoalignment systems capable of compensating for the thermal distortion of a beam-sampling reflection grating.

In many potential high power laser applications it is necessary to control the direction of output beam propagation to within a few micro-radians. Consequently, the development of highly accurate autoalignment systems for such lasers is of current interest. Methods suggested for approaching this alignment problem include using a low-power, usually HeNe, alignment laser beam propagating along the high-power laser train and direct optical sampling of the high-power output beam. The latter method must resolve an initial design problem; standard optical sampling techniques, such as beam splitting, are infeasible due to the extremely high power levels involved. A beam sampling technique which has been suggested for these high power levels is the use of a diffractive reflection grating. However, thermal distortions occurring in close-line-spacing, linear reflection gratings produce errors in the angle of the diffracted beam which limit the usefulness of the grating as a beam sampler in highpower applications. While work has been done on improving the thermal properties of reflection gratings, distortion problems still exist. In addition, it is not clear that the continued improvement of reflection gratings is the most cost effective way to facilitate the use of these gratings in high power laser applications.

SUMMARY OF THE INVENTION

It is therefore an object of the present invention to provide an autoalignment system for a high power laser.

A further object of the present invention is to provide an autoalignment system using a diffractive reflection grating to sample the output laser beam.

Another object of the present invention is to provide an autoalignment system utilizing the diffraction orders of a reflection grating to compensate for the thermal distortion of the grating and to effectuate the alignment of the output beam.

Still another object of the present invention is to provide an autoalignment system capable of maintaining output beam directional stability to within microradian accuracy.

Accordingly, to accomplish these and other objects, the present invention provides a method and system for automatically aligning a high power laser. The autoalignment system employs a diffractive reflection grating to sample the output beam. A tiltable beam alignment mirror reflects a high power laser beam in a path incident to a diffractive reflection grating. This results in a high-power reflected output beam and a number of low-power reflected diffraction order beams. A tiltable distortion compensation mirror is positioned in the path of, and at an oblique angle to, the first two of these diffraction beams. Two auxiliary fixed mirrors, in spaced parallel relation to the distortion compensation mirror, are positioned such that the two diffraction beams are reflected a predetermined number of times off the distortion compensation mirror before each reflects in a path through a focusing lens and incident to a respective null position detector. A misalignment in the laser train or the thermal distortion of the reflection grating will result in deflections of the two sampled diffraction order beams and, consequently, in detected displacements at respective null position detectors. A displacement at the first-order null position detector is translated, by means of a control device, into a correlative tilt adjustment to the beam alignment mirror. Similarly, a displacement detected at the second-order null position detector is translated, by means of another control device, into a correlative tilt adjustment to the distortion compensation mirror. In accordance with certain optical and mathematical principles, these correlative angular adjustments, in the case of the distortion compensation mirror, compensate for the thermal distortion of the reflection grating and, in the case of the beam alignment mirror, correct any misalignment in the laser beam.

A more complete appreciation of the present invention and many of the attendant advantages thereof will result as the same becomes better understood by reference to the following detailed description, with the appended claims, when considered in conjunction with the accompanying drawings.

DESCRIPTION OF THE PREFERRED EMBODIMENT

Figure 1:
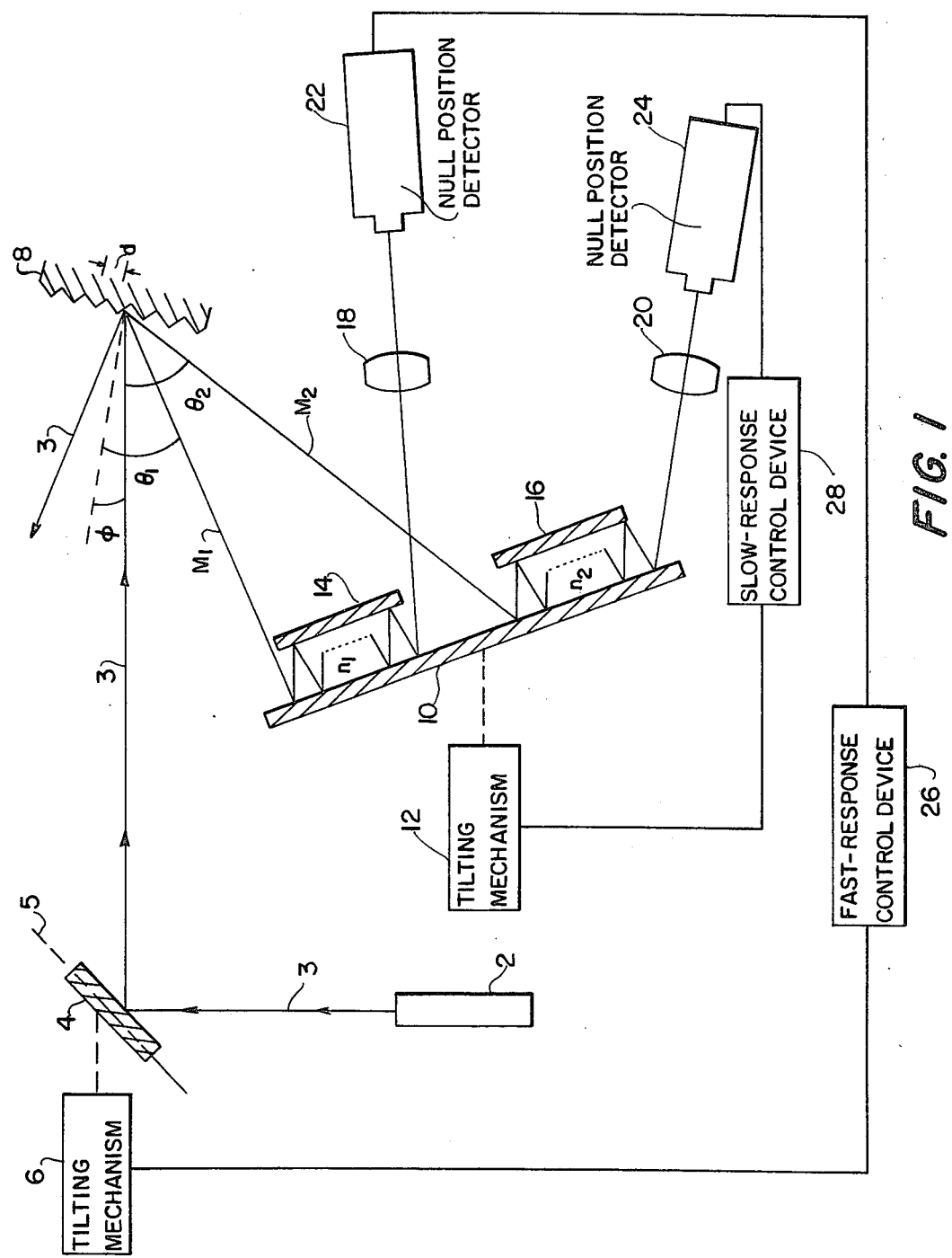
FIG. 1 is a schematic showing of a plan view of an autoalignment system in accordance with the present invention.

Referring now to the drawings, wherein like reference characters designate like or corresponding elements in both views, FIG. 1 shows a laser 2 which generates a high power laser beam 3. Laser beam 3 is incident to a beam alignment mirror 4 which is physically coupled to a tilting mechanism 6. As will be discussed below, beam alignment mirror 4 functions to correct, through tilt adjustments, any misalignment manifested in the direction of laser beam 3. To accommodate this function, beam alignment mirror 4 is designed to be tilted with respect to two separate axes, an axis 5 and an axis (not shown) orthogonal both to axis 5 and to the plane of the schematic as pictured in FIG. 1. Correspondingly, tilting mechanism 6 is capable of effecting both degrees of tilt actuation. Tilting mechanism 6 may employ any means of tilt control, subject to the above requirement, such as two piezoelectric or hydraulic drivers (one for each degree of tilt). Beam alignment mirror 4 is positioned so as to reflect laser beam 3 in a path incident to a diffractive reflection grating 8. Reflection grating 8 is a close-line-spacing, high-power linear diffraction grating with a line spacing "d". Laser beam 3 impinges upon reflection grating 8 at an angle $\phi$ with respect to the normal of the reflection grating. Substantially all of the energy in laser beam 3 is reflected from reflection grating 8, forming the output of the laser system. However, a small portion of the energy is diffracted into several diffraction order beams including first and second order diffraction beams $m_1$ and $m_2$, respectively. These diffraction beams are diffracted at, respectively, angles $\theta_1$ and $\theta_2$ with respect to the normal of reflection grating 8.

A distortion compensation mirror 10 is located in the optical path of, and at an oblique angle to, diffraction beams $m_1$ and $m_2$. Physically coupled to distortion compensation mirror 10 is a tilting mechanism 12. As will be discussed below, distortion compensation mirror 10 functions to correct, through tilt adjustments, for the thermal distortion of reflection grating 8. Since only a distortion in the reflection grating manifested by a change in the line spacing "d" affects the reflected angles of the two diffraction beams $m_1$ and $m_2$, only a single component of thermal distortion is relevant. Thus, to accommodate the distortion compensation function, distortion compensation mirror 10 need only exhibit a single degree of tilt freedom, i.e., that about an axis orthogonal to the plane of the schematic pictured in FIG. 1. Correspondingly, tilting mechanism 12 exhibits only a single degree of tilt actuation, employing any means of tilt control such as a piezoelectric or hydraulic driver. An auxiliary, fixed mirror 14, in spaced parallel relation to distortion compensation mirror 10, is positioned such that first order diffraction beam $m_1$ reflect a predetermined number of times $n_1$ off the distortion compensation mirror before being reflected in a path through a focusing lens 18 and incident to a null position detector 22. Likewise, an auxiliary, fixed mirror 16, in spaced parallel relation to distortion compensation mirror 10, is positioned such that second order diffraction beam $m_2$ reflects a predetermined number of times $n_2$ off the distortion compensation mirror before being reflected in a path through a focusing lens 20 and incident to a null position detector 24. Focusing lenses 18 and 20 serve to focus the relatively large diameter diffraction beams of a high power laser beam into the relatively small diameter beams suitable for use with typically available null position detectors. Null position detectors 22 and 24 may each be any device, such as a distributed or segmented quad detector, which generates a two-coordinate error signal indicative of the magnitude and orientation of any displacement of an impinging laser beam from an established null position. As will be discussed more fully below, such deviations in diffraction beams $m_1$ and $m_2$ may result from either the misalignment of laser beam 3 or the thermal distortion of reflection grating 8. This optical misalignment and/or thermal distortion alter the diffracted angles $\theta_1$ and $\theta_2$ of diffraction beams $m_1$ and $m_2$, respectively, causing the diffraction beam deviation.

In the above described manner, the beam sampling function of the autoalignment system according to the present invention is performed by reflection grating 8. The resultant beam samples, i.e., diffraction beams $m_1$ and $m_2$, are directed by the autoalignment system optics to impinge upon null position detectors 22 and 24, respectively, generating error signals in response to any beam deviation. Null position detector 22 is coupled to a fast-response control device 26, which, in turn, is coupled to tilting mechanism 6 attached to beam alignment mirror 4. Similarly, null position detector 24 is coupled to a slow-response control device 28 which, in turn, is coupled to tilting mechanism 12 attached to distortion compensation mirror 10. Any error signals generated by null position detectors 22 and 24 are transmitted to respective control devices 26 and 28. These control devices comprise servo electronics for translating the inputted error signals corresponding to diffraction beam deviations into correlated, corrective servo control signals to respective tilt mechanisms. Fast-response control device 26 essentially provides, in response to a two-coordinate error signal from null position detector 22, two degrees of servo-tilt control to beam alignment mirror 4. Slow-response control device 28 essentially provides, in response to a two-coordinate error signal from null position detector 24, the single degree of servo-tilt control required for distortion compensation mirror 10. As indicated by the nomenclature, the translation response time of control device 26 is relatively rapid with respect to that of control device 28. As will be developed below, this difference in relative error-signal-translation response time enables the autoalignment system according to the present invention to effectively compensate for deviations in diffraction beams $m_1$ and $m_2$ resulting from either the misalignment of laser beam 3 or the thermal distortion of reflection grating 8.

Figure 2:
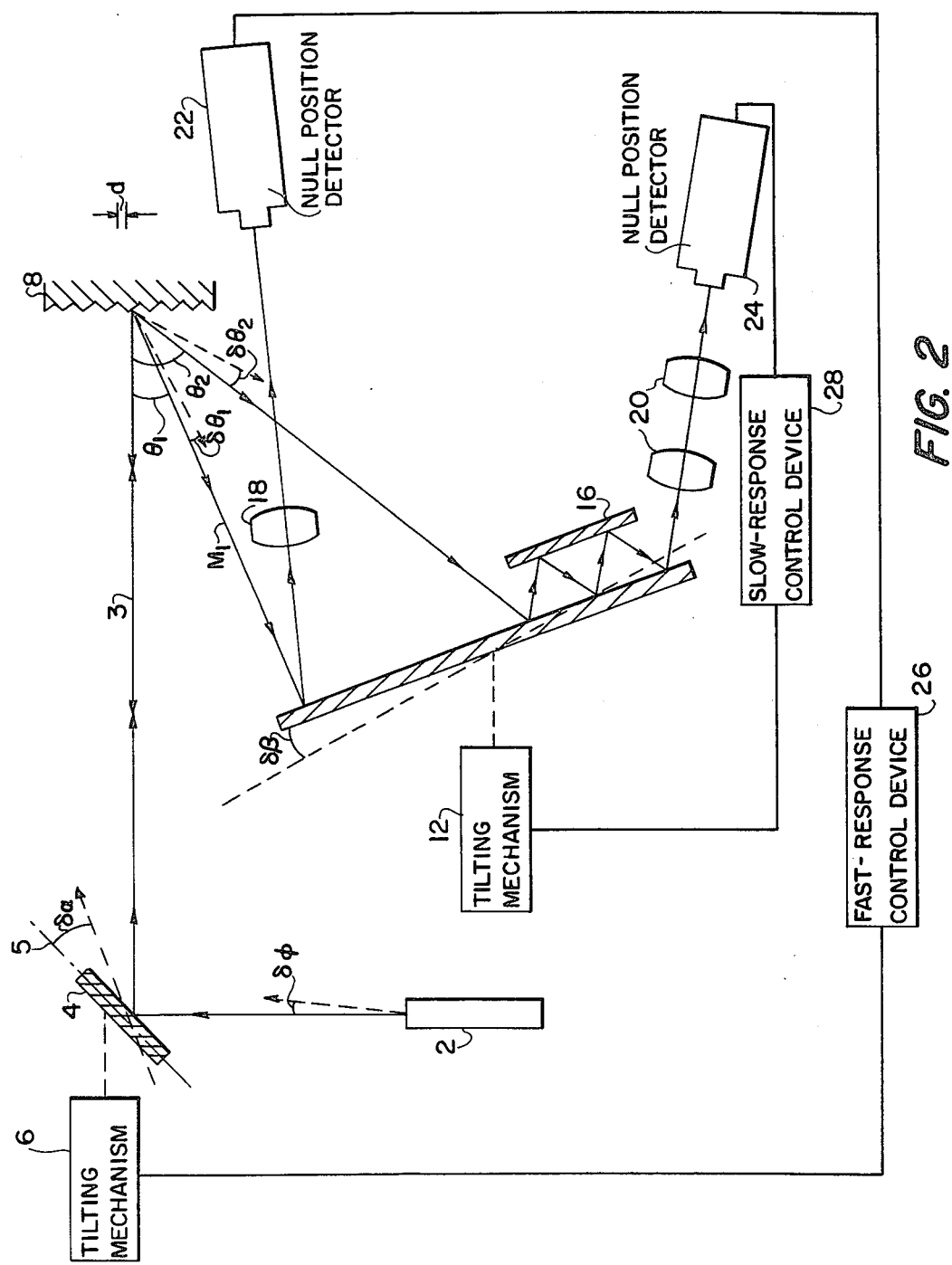
FIG. 2 is a schematic showing of a plan view of an illustrative embodiment of the present invention, structured and labled so as to facilitate discussion of the mathematical relationships involved in the present invention.

Considering now a mathematical analysis of the autoalignment system according to the present invention, FIG. 2 depicts a simplified schematic of the above described autoalignment system which will be used for illustrative purposes. Auxiliary mirror 14, shown in FIG. 1, does not appear in FIG. 2. As a result, first order diffraction beam $m_1$ reflects only once off distortion compensation mirror 10, i.e., $n_1$ is equal to one. Auxiliary mirror 16 is structured so that second order diffraction beam $m_2$ reflects three times off distortion compensation mirror 10, i.e., $n_2$ is equal to three. Reflection grating 8 is positioned perpendicular to the path of laser beam 3 and, thus, $\phi$, the angle laser beam 3 makes with the normal to reflection grating 8, is zero. The angular values of $\theta_1$ and $\theta_2$ will be determined in the mathematical analysis that follows. In this analysis (see FIG. 2), $\delta\phi$ denotes an angular deviation in laser beam 3 due to a directional misalignment in laser 2. The parameters $\delta\alpha$ and $\delta\beta$ are used to represent angular tilt adjustments to beam alignment mirror 4 and distortion compensation mirror 10, respectively. As described above, such tilt adjustments are the alignment response to angular deviations in diffraction order beams $m_1$ and $m_2$, represented in FIG. 2 as $\delta\theta_1$ and $\delta\theta_2$, respectively. It is to be understood that the actual angular magnitudes represented by $\delta\alpha$, $\delta\beta$, $\delta\theta_1$ and $\delta\theta_2$ will be very small, on the order of 10 to 100 micro-radians.

The function of any laser autoalignment system, of course, is to maintain the directional output stability of the laser beam. As described above, the autoalignment system according to the present invention relies on reflection grating 8 to sample output laser beam 3, thereby providing a means for regulating directional output stability. First and second order diffraction beams $m_1$ and $m_2$ diffracted from reflection grating 8 are monitored and any angular deviations in these diffraction beams, represented by $\delta\theta_1$ and $\delta\theta_2$ respectively, are detected. However, as mentioned above, angular displacements $\delta\theta_1$ and $\delta\theta_2$ may result not only from a directional error in output laser beam 3, represented in the FIG. 2 as $\delta\phi$, but also from the thermal distortion of reflection grating 8. The function of the autoalignment system according to the present invention is to translate the angular deviations $\delta\theta_1$ and $\delta\theta_2$ of diffraction beams $m_1$ and $m_2$, respectively, into precise tilt adjustements to beam alignment mirror 4 and distortion compensation mirror 10, thereby compensating for any thermal distortion of reflection grating 8 and cancelling any directional error in output laser beam 3. Therefore, the alignment problem becomes one of distinguishing between the directional error component $\delta\phi$ of diffraction order displacements $\delta\theta_1$ and $\delta\theta_2$ and the component resulting from the thermal distortion of reflection grating 8.

The angle $\theta$ of a beam diffracted off a linear grating with line spacing d is given by $$\text{Sin}\theta + \text{Sin}\phi = m\lambda/d \tag{1}$$

where $\phi$ is the angle of the incident beam, m is the order of the diffraction pattern and $\lambda$ is the wavelength.
Since changes in both the angle of incidence and in the line spacing (due to the thermal distortion of the grating) will affect the angle of the diffracted beam, taking the derivative of equation (1) yields $$\cos\theta\delta\theta = -m\lambda/d\,(\delta d/d) - \cos\phi\delta\phi \tag{2}$$

$$\delta\theta = -m\lambda/d\cos\theta\,(\delta d/d) - \cos\phi/\cos\theta\,(\delta\phi) \tag{3}$$

Now the alignment problem is to identify and separate the effects of the two components of $\delta\theta$, $\delta\phi$ and $\delta d/d$. The operation of the autoalignment system according to the present invention is based upon the fact that, in equation (2), the $\delta\phi$ component of $\cos\theta\,d\theta$ is independent of diffraction order m while the $\delta d/d$ component of $\cos\theta\delta\theta$ is dependent upon the value of m. Specifically, beam alignment mirror 4 is designed to respond to changes in $\cos\theta\delta\theta$ which are independent of m, i.e., diffraction beam angular deviations which result from directional errors $\delta\phi$, by undergoing precise tilt adjustments $\delta\alpha$ (see FIG. 2). Conversely, distortion compensation mirror 10 is designed to respond to changes in $\cos\theta\delta\theta$ which are dependent upon m, i.e., displacements which result from thermal distortion ($\delta d/d$), by undergoing precise tilt adjustments $\delta\beta$ (see FIG. 2). Introducing $\delta\alpha$ and $\delta\beta$ into equation (3) we have $$\delta\theta = -m\lambda/d\cos\theta(\delta d/d) - 2n\delta\beta - \cos\phi/\cos\theta\,(\delta\phi - 2\delta\alpha) \tag{4}$$

where n is the number of reflections of a diffraction beam.

Expanding the foregoing analysis to encompass the two diffraction beams $m_1$ and $m_2$ of the preferred embodiment, equation (4) yields $$\delta\theta_1 = -\cos\phi/\cos\theta_1\,(\delta\phi - 2\delta\alpha) - m\lambda/d\cos\theta_1\,(\delta d/d) - 2n_1\delta\beta \tag{5}$$

$$\delta\theta_2 = -\cos\phi/\cos\theta_2\,(\delta\phi - 2\delta\alpha) - m\lambda/d\cos\theta_2\,(\delta d/d) - 2n_2\delta\beta \tag{6}$$

Note that in both equation (5) and (6), the first right-side term is independent of m, the second right-side term is directly dependent upon m and the third right-side term is indirectly dependent upon m, assuming $n_1$ and $n_2$ are not equal. The autoalignment system according to the present invention seeks to constrain $\delta\theta_1$ and $\delta\theta_2$ to zero by continually adjusting beam alignment mirror 4 and distortion compensation mirror 10 by small tilt corrections $\delta\alpha$ and $\delta\beta$, respectively. Ignoring the $\delta d/d$ thermal contribution to $\delta\theta_1$ and $\delta\theta_2$, it can be seen from the first right-side terms in equations (5) and (6) that tilt adjustements $\delta\alpha$ in beam alignment mirror 4 can be used to compensate for directional misalignments $\delta\phi$ in laser beam 3. Also, since these terms are independent of the diffraction order m, either $\delta\theta_1$ or $\delta\theta_2$ may be used to control the tilt adjustments $\delta\alpha$. In the preferred embodiment, $\delta\theta_1$, detected by null position detector 22, is used to tilt beam alignment mirror 4 by means of fast-response control device 26 and tilting mechanism 6.

Considering, now, the $\delta d/d$ thermal distortion contribution to $\delta\theta_1$ and $\delta\theta_2$, it is to be remembered that using only angular adjustments $\delta\alpha$ to beam alignment mirror 4 will not reduce both $\delta\theta_1$ and $\delta\theta_2$ to zero in the presence of a thermal distortion component because that component is dependent upon the diffraction order m. Therefore, in the second and third right-side terms of equations (5) and (6), the object is to choose values for the parameters $(m_1,m_2)$, $(n_1,n_2)$ and $(\theta_1,\theta_2)$ such that the $\delta d/d$ thermal distortion component of $\delta\theta_1$ and $\delta\theta_2$ will be compensated for by a single angular adjustment $\delta\beta$ in distortion compensation mirror 10. Thus, $$m_1\lambda/d\cos\theta_1\,(\delta d/d) + 2n_1\delta\beta = 0 \tag{7}$$

$$m_2\lambda/d\cos\theta_2\,(\delta d/d) + 2n_2\delta\beta = 0 \tag{8}$$

Dividing equation (7) by (8), the following relationship among the parameters is obtained $$m_1/m_2\,(\cos\theta_2/\cos\theta_1) = n_1/n_2 \tag{9}$$

Of course, the value of these parameters must also be consistent with equation (1).

Considering the simplified example of the illustrative embodiment depicted in FIG. 2, we have $\phi = 0$
$m_1 = 1$
$m_2 = 2$
$n_1 = 1$
$n_2 = 3$.
$\lambda = 10.6$ microns
Equations (1) and (9) become
$\sin\theta_1 = \lambda/d$
$\sin\theta_2 = 2\lambda/d$
$\frac{1}{3}\cos\theta_2/\cos\theta_1 = \frac{1}{3}$.
Simultaneous solution of these equations gives
$\theta_1 = 23°$
$\theta_2 = 52°$ Once the values of the parameters $\phi$, $(m_1,m_2)$, $(n_1n_2)$ amd $(\theta_1,\theta_2)$ have been established, then the mode of operation of the preferred embodiment of the autoalignment system according to the present invention is as follows. Assume, initially, the steady state case where $\delta\phi$, $\delta\theta_1$ and $\delta\theta_2$ are equal to zero. Now, ignoring any thermal distortion effects, assume laser beam 3 becomes misaligned by an angular amount $\delta\phi$. This directional error will result in corresponding angular deviations $\delta\theta_1$ and $\delta\theta_2$ of first and second order diffraction beams $m_1$ and $m_2$. These beam deviations $\delta\theta_1$ and $\delta\theta_2$ will be detected as displacements from the established null positions at null position detectors 22 and 24, respectively. The error signal generated by null position detector 22, being coupled to fast-response control device 26, will cause tilting mechanism 6 to compensate for the directional error $\delta\phi$ by making a tilt adjustment $\delta\alpha$ to the orientation of beam alignment mirror 4. This adjustment will be accomplished before the detected deviation $\delta\theta_2$ translates into an angular adjustment $\delta\beta$ of distortion compensation mirror 10 because null position detector 24 is coupled to the slow-response-time control device 26. And since diffraction beam deviations $\delta\theta_1$ and $\delta\theta_2$ due solely to directional errors $\delta\phi$ are independent of diffraction order m, the more rapid tilt adjustment $\delta\alpha$ to beam alignment mirror 4 will have the effect of eliminating both diffraction beam deviations $\delta\theta_1$ and $\delta\theta_2$ before $\delta\theta_2$ induces any response by distortion compensation mirror 10.

To illustrate the case where reflection grating 8 does exhibit thermal distortion in the line spacing of the grating, assume that no directional error $\delta\phi$ is manifested. Initially, the response of the alignment system will be the same. That is, diffraction beam deviations $\delta\theta_1$ and $\delta\theta_2$ will appear and null position detector 22 will initiate a tilt correction $\delta\alpha$, albeit an erroneous one, to beam alignment mirror 4. However, because the thermal distortion component of diffraction beam deviations $\delta\theta_1$ and $\delta\theta_2$ is dependent upon the diffraction order m, this initial adjustment will not eliminate $\delta\theta_2$. As a result, the displacement $\delta\theta_2$, detected by null position detector 24 and coupled to slow-response control device 28, will be translated into a tilt adjustment $\delta\beta$ to distortion compensation mirror 10. The tilt adjustment $\delta\beta$ will, in turn, eliminate both $\delta\theta_1$ and $\delta\theta_2$, cancelling the effects of thermal distortion on reflection grating 8. In practice, directional misalignments and diffraction beam displacements due to thermal distortions will be relatively small and gradual allowing the laser autoalignment system according to the present invention to maintain a high degree of output beam pointing stability.

Therefore, it is apparent that the disclosed autoalignment system for a high power laser allows for the dependable use of a diffractive reflection grating to sample a high power laser output beam. The autoalignment system compensates for the thermal distortion of the reflection grating, permitting the diffraction beams to be used to maintain output directional stability.

Obviously, other embodiments and modifications of the present invention will readily come to those of ordinary skill in the art having the benefit of the teachings presented in the foregoing description and the drawings. It is, therefore, to be understood that this invention is not to be limited thereto and that said modifications and embodiments are intended to be included within the scope of the appended claims.

What is claimed as new and desired to be secured by Letters Patent of the United States is:

1. An autoalignment system for a high power laser comprising:
    a diffractive reflection grating for separating an incident laser beam into a reflected beam and, at least, a first order diffraction beam and a second order diffraction beam, said diffraction beams manifesting angular deflections as a result of either the directional misalignment of said incident laser beam or the thermal distortion of said reflection grating;
    beam alignment means for reflecting said laser beam on a path incident to said reflection grating;
    detecting means for generating a deflection error signal, corresponding to the degree of deflection from an established reference point, for each of at least two incident beams;
    distortion compensation means, positioned in the path of both said first order diffraction beam and said second order diffraction beam, for reflecting each of said diffraction beams a predetermined number of times prior to being reflected onto paths incident to said detecting means;
    first tilting means for establishing the orientation of said beam alignment means and thereby the reflected direction of said laser beam;
    second tilting means for establishing the orientation of said distortion compensation means and thereby the paths incident to said detecting means of said reflected diffraction beams; and,
    control means coupled between said detecting means and said first and second tilting means, responsive to said deflection error signals for controlling said first and second tilting means, such that the detected angular deviations in said first and second order diffraction beams are translated into correlative, corrective tilt adjustments to said beam alignment means and said distortion compensation means in accordance with the relationship $$\delta\theta = -m\lambda/d \cos\theta \, (\delta d/d) - 2n\delta\beta - \cos\phi/\cos\phi \, (\delta d - 2\delta\alpha)$$

wherein $\theta$ is the angle a respective diffraction beam makes with the normal of said reflection grating ($\delta\theta$ representing the angular deflection of said diffraction beams); m is the diffraction order; d is the diffraction-line spacing of said reflection grating; n is the number of reflections from said distortion compensation means for a respective diffraction beam; $\delta\alpha$ is an angular tilt adjustment to said beam alignment means; $\delta\beta$ is an angular tilt adjustment to said distortion compensation means; and $\phi$ is the angle said laser beam makes with the normal of said reflection grating; and wherein the component of the angular deviations in said diffraction beams related to a directional misalignment of said laser beam is independent of the diffraction order of said diffraction beams and the component of the angular deviations in said diffraction beams related to a thermal distortion of said reflection grating is dependent upon the diffraction order of said diffraction beams;
    said control means translating the angular deviations in said diffraction beams which are independent of the diffraction order of said diffraction beams into tilt adjustment commands to said first tilting means, thereby correcting for directional misalignments in said laser beam; and
    said control means translating the angular deviations in said diffraction beams which are dependent upon the diffraction order of said diffraction beams into tilt adjustment commands to said second tilting means, thereby correcting for the thermal distortion of said reflection grating.

2. An autoalignment system as recited in claim 1 wherein said detecting means comprises:
    a first null position detector, located in the optical path of said first order diffraction beam; and
    a second null position detector, located in the optical path of said first order diffraction beam.

3. An autoalignment system as recited in claim 2 wherein said control means comprises:
    a fast-response control device coupled between said first null position detector and said first tilting means, whereby the detected deviation in said first order diffraction beam can be translated into correlative, corrective tilt adjustments to said beam alignment means; and
    a slow-response control device coupled between said second null position detector and said second tilting means, whereby the detected deviation in said second order diffraction beam can be translated into correlative, corrective tilt adjustments to said distortion compensation means, said fast response control device functioning to translate said deflection error signals into tilt adjustment commands relatively faster than such function is performed by said slow-response control device.

4. An autoalignment system as recited in claim 2 wherein said distortion compensation means comprises:

a distortion compensation mirror positioned in the path of, and at an oblique angle to, both said first and said second order diffraction beams;

said distortion compensation mirror being coupled to said second tilting means and capable of tilt adjustment thereby;

a first auxiliary mirror being fixed in substantial parallel relation to said distortion compensation mirror; said first auxiliary mirror being positioned such that said first order diffraction beam reflects a predetermined number of times off said distortion compensation mirror before reflecting in a path incident to said detecting means; and a second auxiliary mirror being fixed in substantial parallel relation to said distortion compensation mirror; said second auxiliary mirror being positioned such that said second order diffraction beam reflects a predetermined number of times off said distortion compensation mirror before reflecting in a path incident to said detecting means.

5. An autoalignment system as recited in claim 4 wherein:

said first null position detector comprises a quad detector, either distributed or segmented; and said second null position detector comprises a quad detector, either distributed or segmented.

6. An autoalignment system as recited in claim 5 further comprising:

a first focusing lens located between said distortion compensation means and said detection means and in the optical path of said first order diffraction beam whereby said first order diffraction beam is focused into a narrow beam; and, a second focusing lens located between said distortion compensation means and said detection means and in the optical path of said second order diffraction beam whereby said second order diffraction beam is focused into a narrow beam.

7. An autoalignment system as recited in claim 6 wherein:

said first tilting means comprises either a piezoelectric or an hydraulic driver; and said second tilting means comprises either a piezoelectric or an hydraulic driver.

8. An autoalignment system as recited in claim 7 wherein said beam alignment means comprises a mirror.

9. An autoalignment system for a high power laser comprising:

a. a diffractive reflection grating for separating an incident laser beam into a reflected beam and, at least, a first order diffraction beam and a second order diffraction beam, said diffraction beams manifesting angular deflections as a result of either the directional misalignment of said incident laser beam or the thermal distortion of said reflection grating;

b. beam alignment means for reflecting said laser beam on a path incident to said reflection grating;

c. detecting means for generating a deflection error signal, corresponding to the degree of deflection from an established reference point, for each of at least two incident beams;

d. distortion compensation means, positioned in the path of both said first and said second order diffraction beams, for reflecting each of said diffraction beams a predetermined number of times prior to being reflected onto paths incident to said detecting means;

e. control means, responsive to said deflection error signals, for controlling the orientations of said beam alignment means and said distortion compensation means, such that the detected deflections in said first and second order diffraction beams are translated into angular adjustments in the beam alignment means and the distortion compensation means, and are correlated to correct the corresponding misalignment of said incident laser beam and/or thermal distortion of said reflection grating, in accordance with the relationship $$\delta\theta = -m\lambda/d \cos\theta(\delta d/d) - 2n\delta\beta - \cos\phi/\cos\phi\,(\delta d - 2\delta\alpha)$$

wherein $\theta$ is the angle a respective diffraction beam makes with the normal of said reflection grating ($\delta\theta$ representing the angular deflection of said diffraction beams), m is the diffraction order, d is the diffraction-line spacing of said reflection grating, n is the number of reflections from said distortion compensation means for a respective diffraction beam, $\delta\alpha$ is an angular adjustment to said beam alignment, $\delta\beta$ is an angular adjustment to said distortion compensation means, and $\phi$ is the angle said laser beam makes with the normal of said reflection grating; the angular deflection $\delta\theta$ in said respective diffraction beam comprising a component corresponding to a directional misalignment of said laser beam which is independent of the diffraction order m of the respective diffraction beam, and a component corresponding to a thermal distortion of said reflection grating which is dependent upon the diffraction order m of the respective diffraction beam.

10. The autoalignment system as recited in claim 9 wherein said control means comprises:

a. first tilting means, responsive to a first tilt signal, for establishing the orientation of said beam alignment means and thereby the reflected direction of said laser beam;

b. second tilting means, responsive to a second tilt signal, for establishing the orientation of said distortion compensation means and thereby the paths incident to said detecting means of said reflected diffraction beams; and c. deflection translation means responsive to said deflection error signals for generating said first and second tilt signals, such that the detected deflections in said first and second order diffraction beams are translated into angular adjustments in the beam alignment means and the distortion compensation means, and are correlated to correct the corresponding misalignment of said incident laser beam and/or thermal distortion of said reflection grating, in accordance with the relationship $$\delta\theta = -m\lambda/d \cos\theta\,(\delta d/d) - 2n\delta\beta - \cos\phi/\cos\phi\,(\delta d - 2\delta\alpha)$$

wherein $\theta$ is the angle a respective diffraction beam makes with the normal of said reflection grating ($\delta\theta$ representing the angular deflection of said diffraction beams), m is the diffraction order, d is the diffraction-line spacing of said reflection grating, n is the number of reflections from said distortion compensation means for a respective diffraction beam, $\delta\alpha$ is an angular adjustment to said beam alignment means, $\delta\beta$ is an angular adjustment to said distortion compensation means, and $\phi$ is the angle said laser beam makes with the normal of said reflection grating; the angular deflection $\delta\theta$ in said respective diffraction beam comprising a component corresponding to a directional misalignment of said laser beam which is independent of the diffraction order m of the respective diffraction beam and a component corresponding to a thermal distortion of said reflection grating which is dependent upon the diffraction order m of the respective diffraction beam.

11. An autoalignment system as recited in claim 10 wherein said detecting means comprises:
   a. a first null position detector, located in the optical path of said first order diffraction beam; and
   b. a second null position detector, located in the optical path of said second order diffraction beam.

12. An autoalignment system as recited in claim 11 wherein said deflection translation means comprises:
   a. a fast-response control device coupled between said first null position detector and said first tilting means, whereby the detected deviation in said first order diffraction beam can be translated into correlative, corrective tilt adjustments to said beam alignment means; and
   b. a slow-response control device coupled between said second null position detector and said second tilting means, whereby the detected deviation in said second order diffraction beam can be translated into correlative, corrective tilt adjustments to said distortion compensation means,
   c. said fast-response control device functioning to translate said deflection error signals into tilt signals relatively faster than such function is performed by said slow-response control device.

13. An autoalignment system as recited in claim 12 wherein said distortion compensation means comprises:
   a. a distortion compensation mirror positioned in the path of, and at an oblique angle to, both said first and said second order diffraction beams;
   b. said distortion compensation mirror being coupled to said second tilting means and capable of tilt adjustment thereby;
   c. a first auxiliary mirror being fixed in substantial parallel relation to said distortion compensation mirror; said first auxiliary mirror being positioned such that said first order diffraction beam reflects a predetermined number of times off said distortion compensation mirror before reflecting in a path incident to said detecting means; and
   d. a second auxiliary mirror being fixed in substantial parallel relation to said distortion compensation mirror; said second auxiliary mirror being positioned such that said second order diffraction beam reflects a predetermined number of times off said distortion compensation mirror before reflecting in a path incident to said detecting means.

14. An autoalignment system as recited in claim 13 wherein:
   a. said first null position detector comprises a quad detector, either distributed or segmented; and
   b. said second null position detector comprises a quad detector, either distributed or segmented.

15. An autoalignment system as recited in claim 14 further comprising:
   a. a first focusing lens located between said distortion compensation means and said detection means and in the optical path of said first order diffraction beam whereby said first order diffraction beam is focused into a narrow beam; and,
   b. a second focusing lens located between said distortion compensation means and said detection means and in the optical path of said second order diffraction beam whereby said second order diffraction beam is focused into a narrow beam.

16. An autoalignment system as recited in claim 15 wherein:
   a. said first tilting means comprises either a piezoelectric or an hydraulic driver; and
   b. said second tilting means comprises either a piezoelectric or an hydraulic driver.

17. An autoalignment system as recited in claim 16 wherein said beam alignment means comprises a mirror.

* * * * *